United States Patent
Hupp et al.

(10) Patent No.: US 10,201,946 B2
(45) Date of Patent: Feb. 12, 2019

(54) SEPARATION WELDING DEVICE AND METHOD FOR THE SECTIONAL JOINING AND SECTIONAL SEPARATING OF WELDABLE FILM LAYERS USING A SEPARATION WELDING DEVICE

(71) Applicant: ROPEX Industrie-Elektronik GmbH, Bietigheim-Bissingen (DE)

(72) Inventors: Alexander Hupp, Sulzfeld (DE); Robert Peters, Bietigheim-Bissingen (DE)

(73) Assignee: ROPEX INDUSTRIE-ELEKTRONIK GMBH, Bietigheim-Bissingen (DE)

( * ) Notice: Subject to any disclaimer, the term of this patent is extended or adjusted under 35 U.S.C. 154(b) by 9 days.

(21) Appl. No.: 15/606,121

(22) Filed: May 26, 2017

(65) Prior Publication Data
US 2017/0341332 A1    Nov. 30, 2017

(30) Foreign Application Priority Data
May 30, 2016  (EP) .................................... 16171973

(51) Int. Cl.
B32B 41/00  (2006.01)
B31B 70/64  (2017.01)
(Continued)

(52) U.S. Cl.
CPC ............ *B31B 70/645* (2017.08); *B29C 65/02* (2013.01); *B29C 65/224* (2013.01); *B29C 65/38* (2013.01); *B29C 65/7451* (2013.01); *B29C 66/1122* (2013.01); *B29C 66/43* (2013.01); *B29C 66/8161* (2013.01); *B29C 66/8322* (2013.01); *B29C 66/9221* (2013.01); *B29C 66/9231* (2013.01); *B31B 70/005* (2017.08); *B31B 70/16* (2017.08); *B29C 66/8122* (2013.01); *B29C 66/81811* (2013.01); *B29C 66/81871* (2013.01); *B29C 66/91315* (2013.01); *B29C 66/91651* (2013.01); *B29C 66/924* (2013.01);
(Continued)

(58) Field of Classification Search
CPC ....... B31B 70/645; B29C 66/43; B29C 65/02; B29C 65/224; B29C 66/9231; B29C 65/38; B29C 66/9221; B29C 65/7451; B29C 66/8322; B29C 66/1122
USPC ........................... 156/64, 350, 351, 378, 379
See application file for complete search history.

(56) References Cited

FOREIGN PATENT DOCUMENTS

| JP | H07232715 | 5/1995 |
|---|---|---|
| JP | 2007191197 | 2/2007 |
| WO | WO2014079457 | 5/2014 |

*Primary Examiner* — Michael N Orlando
*Assistant Examiner* — Joshel Rivera
(74) *Attorney, Agent, or Firm* — Hoffman & Baron, LLP

(57) ABSTRACT

A separation welding device for the sectional joining and sectional separation of weldable film layers includes a temperature-controlled working surface that is designed to support joinable and separable film layers and further includes an electrical heating device as well as a counter-holder for sectionally applying pressure to the joinable and separable film layers, which delimits a variably adjustable working gap with the working surface and that includes two mutually spaced joining stamps and one separating stamp arranged between the joining stamps wherein the separating stamp and/or at least one joining stamp is moveably attached to the counterholder wherein provision can be made for the separating stamp and/or the joining stamp to each be assigned a force sensor and/or a motion sensor to calculate a separation sequence determined by the separating stamp and/or a joining sequence determined by the joining stamp.

9 Claims, 1 Drawing Sheet

(51) Int. Cl.
  *B31B 70/00*  (2017.01)
  *B31B 70/16*  (2017.01)
  *B29C 65/02*  (2006.01)
  *B29C 65/22*  (2006.01)
  *B29C 65/38*  (2006.01)
  *B29C 65/74*  (2006.01)
  *B29C 65/00*  (2006.01)
  *B31B 155/00*  (2017.01)
  *B29L 7/00*  (2006.01)

(52) U.S. Cl.
  CPC ... *B29C 66/92211* (2013.01); *B29C 66/92311* (2013.01); *B29L 2007/00* (2013.01); *B31B 2155/003* (2017.08)

SEPARATION WELDING DEVICE AND METHOD FOR THE SECTIONAL JOINING AND SECTIONAL SEPARATING OF WELDABLE FILM LAYERS USING A SEPARATION WELDING DEVICE

BACKGROUND OF THE INVENTION

The invention relates to a separation welding device for the sectional joining and sectional separation of weldable film layers, with a temperature-controlled working surface that is designed to support joinable and separable film layers, and comprises an electrical heating device as well as a counterholder for sectionally applying pressure to the joinable and separable film layers, which delimits a variably adjustable working gap with the working surface and comprises two mutually spaced joining stamps and one separating stamp arranged between the joining stamps, wherein the separating stamp and/or at least one joining stamp is moveably attached to the counterholder.

Separation welding devices of this type are used, for example, in the field of packaging technology in order to produce individual film bags from an endless film tube. In this case, the film tube is divided into individual tube sections by pressing the separating tool onto the film layers in the direction of the working surface in combination with heating the film layers. With the aid of the joining stamp, the respective end sections of the film layers are sealingly welded to the side of the separation point produced by the separating stamp, wherein the desired welding process is also carried out through a combination of compressive forces, which are generated by the interaction between the joining stamps and the working surface, and heating the film layers of the film tubes.

SUMMARY OF THE INVENTION

The object of the invention is to enable improved monitoring of the separation welding process, in order to allow a process window to be widened with regard to the clock cycles for the separation welding process and/or the material requirements and dimensions of the film layers and/or the heat input on the film layers during the separation welding process.

According to a first aspect of the invention for a separation welding device of the type mentioned in the introduction, this object is achieved through the separating stamp and/or the joining stamp each being assigned a force sensor and/or a motion sensor, in particular a path sensor, to calculate a separation sequence determined by the separating stamp and/or a joining sequence determined by the joining stamp. Based on the sensor signals provided by the force sensor and/or the motion sensor, a suitable control device can draw conclusions about the progression of the separation process or the joining process. Based on this information, the control device can control the adjustment of the working gap between the separating stamp and the working surface or the working gap between the joining stamp and the working surface and/or centre the working surface by appropriately controlling the heating devices. For example, the speed at which the separating stamp and/or at least one joining stamp approaches the working surface can be controlled. In addition or alternatively, the heat input on the film layers can be varied by corresponding control of the heating devices in order to achieve an advantageous separation and joining result. For example, provision can be made for the joining stamps to be rigidly fastened to the counterholder, while the separating stamp is arranged on the counterholder in such a way that, when the respective working gap is narrowed, it has first contact with the film layers, so that the separating process is initiated before the joining process. In this case, based on the sensor signals of the force sensor and/or the motion sensor, a movement of the counterholder as a function of the separation process can be controlled or regulated in order to achieve, for example, reliable separation of the film layers in combination with a visually appealing parting line process.

Advantageous modifications of the invention are the subject matter of the sub-claims.

It is expedient if, between the counterholder and the separating stamp and/or the counterholder and the at least one joining stamp, a drive device for linear adjustment movement of the separating stamp and/or the at least one joining stamp is arranged opposite the counterholder. Targeted movement of each stamp, i.e. the separating stamp or the joining stamp individually approaching or retreating from the working surface, can be achieved with the aid of a drive device. The drive device is exemplarily designed as an electrical drive, in particular in the form of a geared motor or spindle motor or piezo actuator, or as a fluidic drive, in particular in the form of a hydraulic or pneumatic cylinder.

It is advantageous if the separating stamp and/or the at least one joining stamp are elastically linearly movably coupled to the counterholder. Through this, provision can be made, in particular for the joining stamps, for force limitation for the film layers that are joinable with the aid of the separation welding device. A flexible coupling can be operated by means of a spring device in particular that is arranged between the respective separating stamp or joining stamp and the counterholder. Preferably, features of this spring device, such as an elastic constant for a proportionally operating coiled spring, are stored in a control device, so that, for example, conclusions can be drawn about the compressive force introduced by the respective stamp onto the film layers and/or the path travelled by the respective stamp to the deformation of the foils that has already occurred.

For this purpose, in an advantageous modification of the invention, provision is made for a control device that provides drive energy as a function of a force signal from the respective force sensor and/or a movement signal from the respective motion sensor to be assigned to the drive device. The control device is preferably a motor controller that comprises control electronics with a microprocessor as well as a power unit for providing electrical currents, and is designed to control an electrical drive. A value table or an algorithm can be stored in the microprocessor or in memory assigned to the microprocessor, which are used to appropriately convert incoming force signals or movement signals in such a way that information for force-controlled and/or position-controlled actuation of the associated drive device can be determined. This information is converted by the control electronics into switching signals for the power unit, and is provided to the power unit in order to supply the desired electrical power to the drive device.

In a further embodiment of the invention, provision can be made for the force sensor to be connected to the drive device and be designed as a sensor from the group: electrical current sensor, electrical voltage sensor, expansion sensor, fluid pressure sensor. With the aid of an electrical current sensor, the current provided to the drive device can be measured in order to subsequently determine the compressive force delivered by the drive device. Current sensors can, for example, be used for DC motors, in which there is a predictable relationship between the input current and the output force. Electrical voltage sensors can, for example, be used for force measurement in the case of piezo actuators. A strain sensor allows for force measurement independently of the selected drive principle of the drive device, for example the strain sensor can be designed as a strain gauge with strain-dependent electrical resistance. Such a strain sensor is exemplarily arranged on an actuator of the drive device, for example a piston rod of a hydraulic or pneumatic cylinder or a gear rack of a geared motor, and determines pressure-dependent deformation of the respective actuator. In an embodiment of the drive device as a fluidic drive, a fluid pressure sensor can be used additionally or alternatively to a strain sensor, by means of which the pressure level of the pressurised working fluid provided to the drive device can be determined.

Preferably, the motion sensor is arranged as a displacement transducer between the counterholder and the separating stamp and/or the at least one joining stamp, or as an acceleration sensor on the separating stamp and/or the at least one joining stamp. With the aid of a motion sensor, the actual path that the respective stamp performs relative to the counterholder can be determined. In an embodiment of the motion sensor as a displacement transducer, an optical, contactless measuring system or an intuitive dipping coil system can be used, for example. Alternatively, provision can be made for determining the movement of the respective stamp in relation to the counterholder by means of an acceleration sensor. This is of particular interest if, for the sake of simplifying the separating welding device, the counterholder is not assigned its own motion sensor. In this case, a movement of the separating stamp or the joining stamp that results from the overlap of a movement of the counterholder and a movement of the drive device assigned to the respective stamp can be determined based on the resultant accelerations.

It is expedient if the separating stamp and each of the joining stamps are each assigned a drive device and a force sensor and/or a motion sensor. This allows individual control of the respective separating and joining processes for the individual stamps.

It is advantageous if the electrical heating device is designed as an impulse welding device. In the case of an impulse welding device, as marketed by the applicant under the product name "CIRUS", provision is made for a layer construction of electrically conductive and electrically insulating, preferably at least partially ceramic layers, on a metallic support. When the electrically conductive layers are appropriately controlled, preferably in combination with active cooling, in particular by means of a liquid cooling fluid, it enables the heating process of such a heating device to have a temperature gradient of more than 500 degrees Celsius per second, preferably more than 1000 degrees Celsius per second, in particular up to 7000 degrees Celsius per second. During subsequent cooling, a temperature gradient of up to 1500 degrees Celsius per second can be achieved based on the maximum temperature of the heating device.

When using an impulse welding device in the form of an electrical heating tape, for example in the "RESISTRON" system marketed by the applicant, a temperature gradient of 100 to 200 degrees Celsius per second is exemplarily achieved during the heating process, and a temperature gradient of 10 to 50 degrees Celsius per second is exemplarily achieved during the cooling process, based on the maximum temperature of the heating device.

The object of the invention is achieved according to a second aspect of the invention by a method for the sectional joining and sectional separating of weldable film layers using a separation welding device according to the invention. The method comprises the following steps: Provision of the joinable film layers in a variably adjustable working gap between the temperature-controlled working surface and the counterholder provided with the separating stamp and the joining stamps, approach of the separating stamp and/or at least one joining stamp to the working surface for sectionally applying pressure to the joinable and separable film layers, and determination of at least one individual force profile and/or an individual movement sequence for the separating stamp and/or the at least one joining stamp based on force signals from each assigned force sensor and/or based on movement signals from each assigned motion sensor.

In a further modification of the method, provision is made for control of a drive device assigned to the separating stamp to be performed based on the determined individual force profile and/or of the individual movement sequence for the separating stamp and/or control of a drive device assigned to the at least one joining stamp to be performed as a function of the determined individual force profile and/or of the individual movement sequence for the joining stamp.

BRIEF DESCRIPTION OF THE DRAWINGS

An advantageous embodiment of the invention is shown in the drawing. This shows.

DETAILED DESCRIPTION

Figures 1, 2:
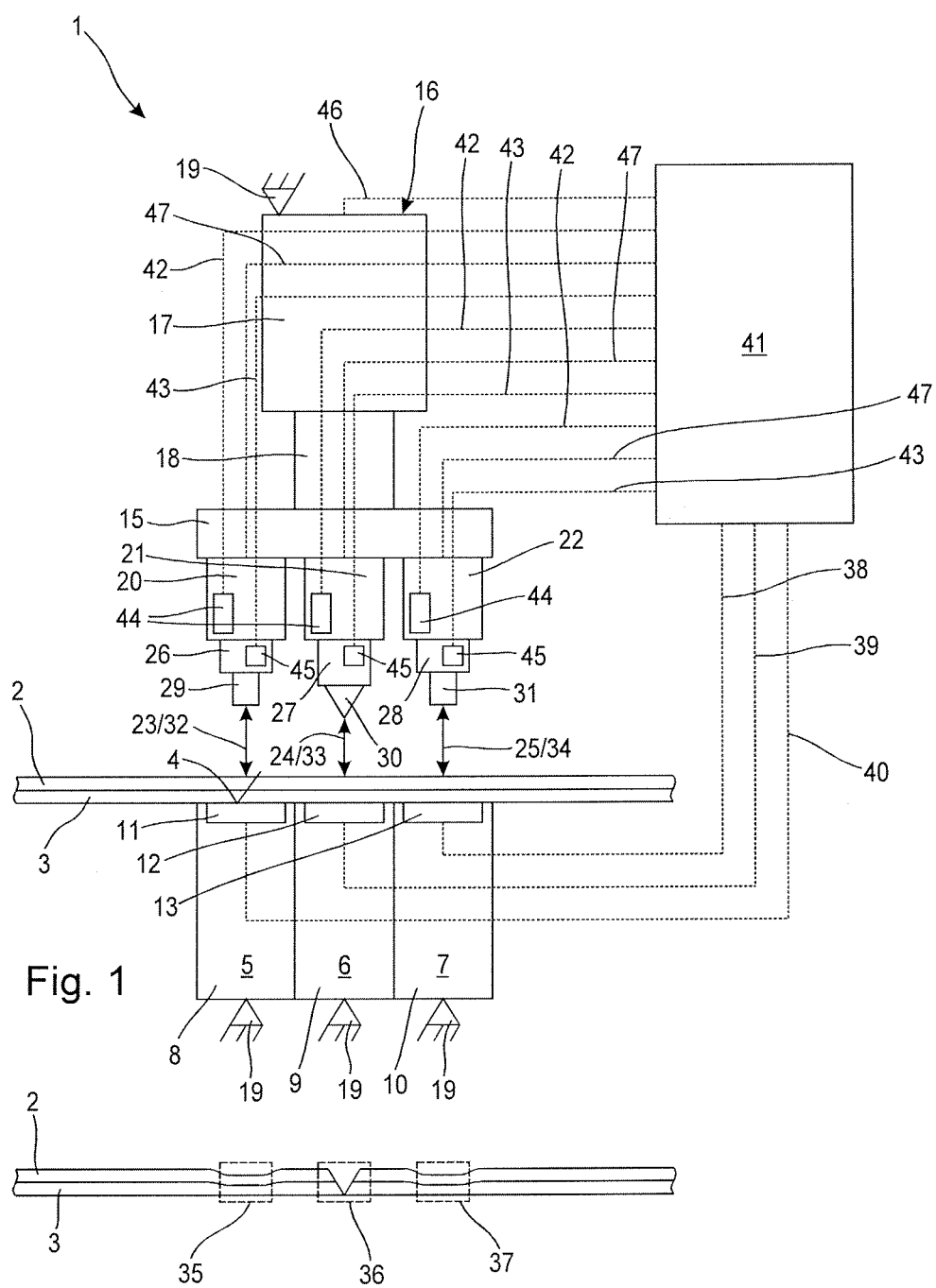
FIG. 1 A separation welding device for sectional joining and sectional separation of weldable film layers using a temperature-controlled working surface, a movably supported counterholder, a joining stamp attached to the counterholder, as well as a separating stamp and a control device.
FIG. 2 A schematic representation of an arrangement of two film layers welded together.

A separation welding device schematically shown in FIG. 1 is designed for sectional joining and sectional separating of weldable foils or film layers 2, 3. The film layers are preferably plastic film layers made from the same or different materials, but always thermally weldable to one another.

The number of weldable film layers 2, 3 in FIG. 1 is shown as two by way of example, but a plurality of film layers made from identical or different materials can be connected to one another as long as the film layers can at least be welded to the adjacent film or film layers.

Such a separation welding device can, for example, be used for locally welding a film tube in order to divide the film tube into a plurality of film bags, each of which is designed to be sealed. Provision can be made, for example, for such a separation welding device 1 to be used for packing bulk goods, in particular foodstuffs, into such film bags.

In order to carry out the desired separation welding process, the separating welding device 1 comprises a temperature-controlled working surface 4, which is divided into three different modules 5, 6 and 7, for example. Each of the modules comprises a frame 8, 9 and 10 and a heating device 11, 12 and 13 that is incorporated into the frame 8, 9 and 10 and flush with the working surface 4, which can be, for example, an electrical impulse welding device described above.

The working surface 4 is exemplarily designed as a platform that normally extends to the platform shown in FIG. 1, and serves as a flat support for the weldable film layers 2 and 3. A counterholder 15, which is exemplarily designed in the form of a plate and connected to a linear actuator 16, is arranged opposite the working surface 4. The linear actuator 16 can be exemplarily designed as a pneumatic or hydraulic piston or as an electrical actuating drive, and comprises a housing piece 17 as well as an actuator 18 that is incorporated movably relative to the housing piece. Provision is made here for the housing piece 17 to be fastened to a machine frame 19 (not shown), to which the modules 5, 6 and 7 are also attached. This ensures a force-transferring connection between the modules 3, 6 and 7 and the housing piece 17 via the machine frame 19.

Provision is also exemplarily made for three, in particular identically formed, positioning units 20, 21 and 22 to be attached to the counterholder 15. Provision is made for these positioning units 20, 21 and 22 to provide a linear movement perpendicular to the working surface 4, as indicated by the corresponding movement arrows 23, 24 and 25. Exemplarily, the positioning units 20, 21 and 22 can be designed as piezo actuators, which develop a great actuating power at a small stroke when electrical voltage is applied. Other embodiments for the positioning units 20, 21, 22, in particular hydraulic, electric or pneumatic drives, are likewise conceivable.

Differently designed stamps are arranged on the front end of actuators 26, 27 and 28 of the positioning units 20, 21 and 22. These are, for example, two joining stamps 29, 31 as well as a separating stamp 30. The joining stamps 29 and 31 as well as the separating stamp 30 each normally extend to the platform shown in FIG. 1 across the entire width of the joinable film layers 2, 3. With the aid of actuator 18 and positioning units 20, 21, 22, they can approach the working surface 4 in such a way that it is possible to exert compressive forces onto the joinable film layers 2, 3 in each remaining working gap 32, 33 and 34. In FIG. 1, by way of example, the positioning unit 21 of the separating stamp 30 is extended further than the positioning units 20, 22 of the two joining stamps 29, 31. Accordingly, the working gap 33 of the separating stamp 30 is also smaller than working gap 32 and 34 of the two joining stamps 29, 31.

Local plastification occurs as a result of the interaction of the compressive forces applied by the stamps 29, 30 and 31 and the heat energy provided by the heating devices 11, 12 and 13. In the case of the joining stamps 29, 31, the local plastification leads to local welding of the film layers 2, 3, as shown in FIG. 2 in the form of welding zones 35 and 37.

The separating stamp 30, which has a wedge-shaped cross-sectional geometry, is designed to form a separating gap between the two film layers 2, 3, and defines a separation zone 36 for the film layers 2, 3, as shown in FIG. 2. The two joining stamps 29, 31 and the separating stamp 30 are exemplarily made from a heat-resistant and dimensionally-stable silicone material.

Exemplarily, provision is made for the three heating devices 11, 12 and 13 to be connected to a control device 41 via assigned supply lines 38, 39, 40. In this case, provision is made for the control device 41 to provide electrical energy to the respective heating devices 11, 12, 13, as long as this is sensible and necessary for carrying out the separation welding process. Furthermore, the control device 41 is electrically connected via sensor lines 42, 43 to sensor elements 44, 45, which are arranged on the respective positioning units 20, 21, 22. The sensor elements 44 are exemplarily designed as current sensors for an electrical current flow provided to the positioning units 20, 21, 22 in order to draw conclusions about the respective movement behaviour and, if appropriate, also about force supply through the corresponding positioning units 20, 21, 22 in the control device 41.

The sensor elements 45 are each arranged on the movable actuators 26, 27, 28 of the positioning units 20, 21, 22 as strain gauges, in particular as strain-dependent resistors, and allow force measurement for the forces exerted by the joining stamps 29, 30 or the separating stamp 31 on the film layers 2, 3. The sensor signals from these sensor elements 45 are also transmitted to the control device 41 in order to be able to draw conclusions about the welding process based on of the pressure force profile.

For the purpose of performing a separation welding process, provision can be made for the following sequence with the aid of the separation welding device 1 shown in FIG. 1.

The film layers 2, 3 (which are not shown as cross-sections for the sake of clarity) belonging to a film tube, for example, are laid flat on the working surface 4, wherein at this time the working gaps 32, 33 and 34 are maximal and the heating devices 11, 12, 13 are disabled.

Control of the linear actuator 16 subsequently takes place via a control line 46, so that the actuator 18 of the linear actuator 16 causes the counterholder 15 as well as the stamps 29, 30, 31 attached to the counterholder 15 to approach the working surface 4. In this case, through appropriate control of the positioning units 20, 21, 22, it is possible to freely define which of the stamps 29, 30, 31 first comes into contact with the film layers 2, 3. Corresponding to the specifications of the control device 41, electrical energy is provided to the positioning units 20, 21, 22 by means of the assigned supply lines 47.

Exemplarily, provision is made for the separation process of the film layers 2, 3 with the help of the separating stamp 30 to occur first; the positioning unit 21 assigned to the separating stamp 30 is activated accordingly in order to cause the separating stamp 30 to additionally approach the working surface 4, as shown schematically in FIG. 1.

When the movement of the actuator 18 of the linear actuator 16 continues based on the representation of FIG. 1, pressure build-up initially occurs through the separating stamp 30 on the film layers 2 and 3, while the joining stamps 29 and 31 only come into contact with the film layers 2, 3 at a later point in time.

Subsequently, the control device 41 activates the heating devices 11, 12, 13. In this way, electrical power is supplied via the supply lines 38, 39, 40 to the heating devices 11, 12, 13, so that these can locally cause heating of the film layers 2, 3. The heating devices 11, 12, 13 extend in a normal direction to the platform shown in FIG. 1 across the width of the film layers 2, 3 in order to guarantee heating of the film layers 2, 3 across their entire width.

Alternatively, provision can be made for at first only activating the associated heating device 12 when carrying out the separation process with the aid of the separating stamp 30, and deactivating the associated heating device 12 after the separation process has been carried out. Heating devices 11 and 13, which are assigned to the joining stamps 29 and 31, are activated either after completion of the separation process or shortly before, and remain active until the joining process is completed by corresponding approach of the joining stamps 29 and 31 to the working surface 4.

Furthermore, it is possible to regulate the movements of the stamps 29, 30, 31 depending on sensor signals from the sensor elements 44 and 45, in order to, for example, limit the maximum pressure on the film layers 2, 3. This particularly applies to the movements of the joining stamps 29 and 31, in which lateral displacement of the material of the film layers 2, 3 by excessive pressure should be avoided.

In an embodiment of a separation welding device not shown, the joining stamps are fixedly connected to the counterholder, while a positioning unit is assigned to the separating stamp. In this way, a similar working result can be achieved with less technical complexity than in the separation welding device 1 described in FIG. 1. Alternatively, provision can be made for the separating stamp to be fixedly connected to the counterholder, while the joining stamps are arranged movably in relation to the counterholder by means of interconnected positioning units.

In a further embodiment of a separating welding device not shown, all the stamps are connected to the counterholder without interconnected positioning units, wherein at least one of the stamps, in particular the separating stamp, is arranged linearly movably on the counterholder with a flexible spring device. In an arrangement of this type, provision can be made, for example, for a suitable sensor element, in particular to determine compressive forces, to be assigned to only one of the joining stamps and/or the separating stamp.

In another embodiment of the separation welding device, which is also not shown, at least one of the modules that form the working surface and are designed with a heating device is suspended linearly movably in relation to the other modules. This can, for example, be the module that is arranged opposite the separating stamp. In this case, it is possible to completely dispense with a movable arrangement of the stamps in relation to one another or in relation to the counterholder. Even with such an arrangement, it is advantageous if at least one of the stamps is assigned a sensor element for determining compressive forces in order to be able to provide the control device with information on the force profile while welding is taking place.

What is claimed is:

1. A separation welding device for the sectional joining and sectional separation of weldable film layers, with a temperature-controlled working surface that is designed to support joinable and separable film layers and comprises an electrical heating device, as well as a counterholder for sectionally applying pressure to the joinable and separable film layers, which delimits a variably adjustable working gap with the working surface and that comprises two mutually spaced joining stamps and one separating stamp arranged between the joining stamps wherein the separating stamp and/or at least one joining stamp is moveably attached to the counterholder, wherein the separating stamp and/or the joining stamp are each assigned a force sensor and/or a motion sensor to calculate a separation sequence determined by the separating stamp and/or a joining sequence determined by the joining stamp; and
    wherein the separating stamp and/or the at least one joining stamp are elastically linearly movably coupled to the counterholder.

2. The separation welding device according to claim 1, wherein between the counterholder and the separating stamp and/or the counterholder and the at least one joining stamp, a drive device for linear adjustment movement of the separating stamp and/or the at least one joining stamp is arranged opposite the counterholder.

3. The separation welding device according to claim 2, wherein a control device for providing drive energy based on a force signal from the respective force sensor and/or a movement signal from the respective motion sensor is assigned to the drive device.

4. The separation welding device according to claim 2, wherein the force sensor is connected to the drive device and is designed as a sensor from the group: electrical current sensor, electrical voltage sensor, expansion sensor, fluid pressure sensor.

5. The separation welding device according to claim 2, wherein the motion sensor is arranged as a displacement transducer between the counterholder and the separating stamp and/or the at least one joining stamp, or as an acceleration sensor on the separating stamp and/or the at least one joining stamp.

6. The separation welding device according to claim 1, wherein the separating stamp and each of the joining stamps are each assigned a drive device and a force sensor and/or a motion sensor.

7. The separation welding device according to claim 1, wherein the electrical heating device is designed as an impulse welding device.

8. A method for sectional joining and sectional separation of weldable film layers using a separation welding device according to claim 1, comprising the steps: Provision of the joinable film layers in a variably adjustable working gap between the temperature-controlled working surface and the counterholder provided with the separating stamp and the joining stamps, approach of the separating stamp and/or at least one joining stamp to the working surface for sectionally applying pressure to the joinable and separable film layers, and determining at least one individual force profile and/or an individual movement sequence for the separating stamp and/or the at least one joining stamp based on force signals from each assigned force sensor and/or based on movement signals from each assigned motion sensor.

9. The method according to claim 8, wherein control of a drive device assigned to the separating stamp is performed based on the determined individual force profile and/or of the individual movement progression for the separating stamp and/or control of a drive device assigned to the at least one joining stamp is performed based on the determined individual force profile and/or of the individual movement progression for the joining stamp.

* * * * *